Dec. 23, 1924.
W. H. DENTON
SEED DROPPER
Filed April 8, 1924
1,520,017
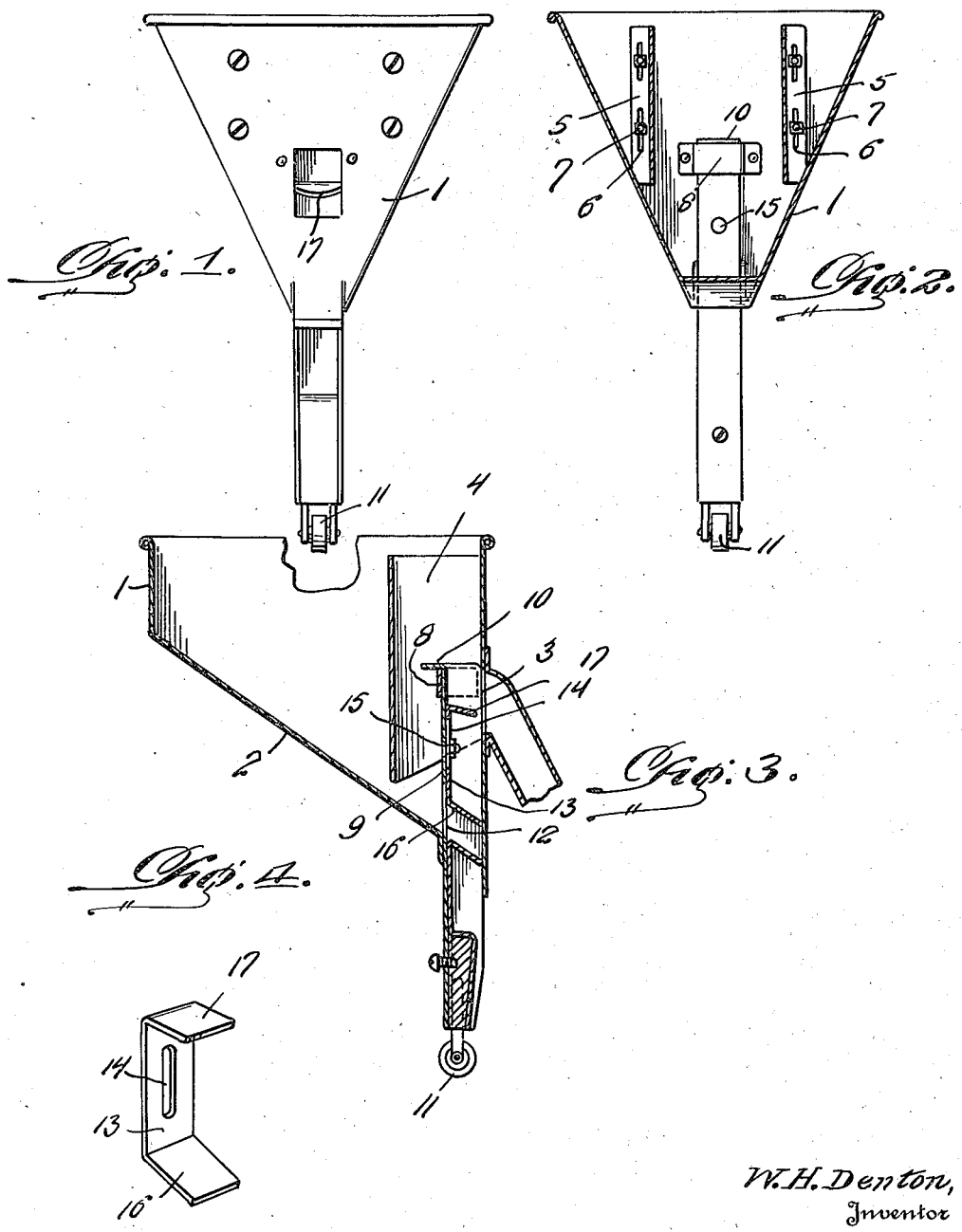

Patented Dec. 23, 1924.

1,520,017

UNITED STATES PATENT OFFICE.

WILLMOTT HENDERSON DENTON, OF WHATELY, MASSACHUSETTS.

SEED DROPPER.

Application filed April 8, 1924. Serial No. 705,023.

*To all whom it may concern:*

Be it known that I, WILLMOTT HENDERSON DENTON, a citizen of the United States, residing at Whately, in the county of Hampshire and State of Massachusetts, have invented certain new and useful Improvements in a Seed Dropper, of which the following is a specification.

This invention relates to a seed dropping mechanism and it consists in the novel features hereinafter described and claimed.

An object of the invention is to provide a mechanism of the character stated which is of a simple and durable nature and having its parts so arranged and assembled that they may be readily adjusted to regulate the quantity of seed which is dropped.

With this object in view the mechanism includes a hopper having an inclined bottom and with a septum wall section adjustably located therein. The hopper is provided at its side with a seed outlet opening which is spaced above the lower edge of the inclined bottom. A slide member is mounted for movement vertically and transversely of the said opening and is adapted to receive the seed at the lowest point of the hopper and the inclined bottom thereof and carry the seed up and deposit the same through the outlet opening in the side of the hopper.

In the accompanying drawing:—

Figure 1 is a side elevation of the seed dropping mechanism.

Figure 2 is a transverse sectional view of the same.

Figure 3 is a transverse sectional view of the same cut on a plane at a right angle to the plane upon which the view illustrated in Figure 2 is cut.

Figure 4 is a perspective view of a seed gauge member which is carried by the seed slide.

As illustrated in the accompanying drawing, the seed dropping mechanism comprises a hopper 1 having an inclined bottom wall 2. The hopper 1 is provided at that side thereof which is vertically disposed above the lower portion of the bottom wall 2 with an outlet opening 3. A plate 4 is located interiorly of the hopper 1 and is provided with side flanges 5 having vertically disposed slots 6. Bolts 7 pass transversely through the wall of the hopper 1 and through the slot 6 and by loosening the bolts 7 the plate 4 may be shifted vertically within the hopper and its lower edge may be disposed at a desired distance above the lower portion of the inclined bottom wall 2 of the hopper. The plate 4 forms a septum wall which is located within the hopper and which is intended to hold the volume of seed back or away from the outlet opening 3. A guide loop 8 is mounted in the hopper 1 with its ends secured to the side of the hopper at opposite sides of the outlet opening 3. A slide member 9 passes transversely through the bottom of the hopper and its upper end portion is received within the guide 8. The slide member 9 is provided at its upper end with a flange 10 adapted to engage the upper edge of the guide 8 whereby the downward movement of the slide 9 in the hopper is limited. A roller 11 is carried at the lower end of the slide member 9 and may ride upon the periphery of a cam or an eccentric (not shown), whereby the said slide member 9 may be moved vertically in the hopper 1. The slide member 9 is provided at a point between its ends with a seed passageway 12, the bottom wall of which is downwardly inclined substantially at the same angle as the angle of inclination of the bottom wall 2 of the hopper 1. A gage plate 13 is mounted within the upper portion of the slide member 9 and is provided with a vertically disposed slot 14 through which a bolt 15 passes. The bolt 15 also passes through the slide member 9. By loosening the bolt 15 the gage plate 13 may be shifted vertically along the side member 9. The gage plate 13 is provided at its lower end with a flange 16 which is disposed parallel with the bottom wall of the passage 12. The said gage plate 13 is also provided at its upper end with a flange 17 which is disposed toward the outlet opening 3 in the side of the hopper 1.

It is apparent that when the seed (not shown) is deposited in the hopper 1, the body or bulk of the seed is held back by the plate 4 and some of the seed may pass by gravity under the lower edge of the plate 4 and along the upper surface of the inclined bottom 2 and enter the passageway 12 in the slide member 9. This seed is carried up as the said slide member 9 is moved in an upward direction and when the bottom wall of the passage way 12 arrives at the lower edge of the opening 3 in the body 1 the seed passes out of the hopper through the said opening. By shifting or adjusting the gage plate 13 along the slide member 9, the quantity or amount of seed which is received within the passageway 12 may be regulated. The flange 17 on the gage plate serves to direct seed which may find its way over the upper end of the slide member outwardly through the opening 3 and prevent the same from collecting on top of the flange 16.

Having thus described my invention, what I claim is:—

A seed dropping mechanism comprising a hopper having an inclined bottom wall and provided at its side with an outlet opening, a guide located within the hopper at the outlet opening thereof, a slide member received within the guide and passing transversely through the bottom of the hopper, said slide member having a seed passageway, a gage plate located in the slide member and having an intermediate portion provided with a slot, a bolt passing through said slot and the said slide member, the gage plate being provided at its lower end with a flange disposed parallel with the bottom wall of the seed passage way in the slide member and the said gage plate being provided at its upper end with a flange which is disposed toward the outlet opening in the hopper.

In testimony whereof I affix my signature.

WILLMOTT HENDERSON DENTON.